(12) United States Patent
Carbone et al.

(10) Patent No.: US 9,726,516 B2
(45) Date of Patent: Aug. 8, 2017

(54) DIFFERENTIAL MOTION SENSOR

(71) Applicant: Hamilton Sundstrand Corporation, Windsor Locks, CT (US)

(72) Inventors: Michael Carbone, Rockford, IL (US); Scott C. Bonnett, Chicago, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 204 days.

(21) Appl. No.: 14/819,943

(22) Filed: Aug. 6, 2015

(65) Prior Publication Data

US 2017/0038225 A1    Feb. 9, 2017

(51) Int. Cl.
*G01B 7/16* (2006.01)
*G01D 5/12* (2006.01)
*B64D 45/00* (2006.01)
*H01H 35/00* (2006.01)

(52) U.S. Cl.
CPC ........... *G01D 5/12* (2013.01); *B64D 45/0005* (2013.01); *H01H 35/006* (2013.01); *B64D 2045/001* (2013.01)

(58) Field of Classification Search
CPC .................. G01D 5/12; B64D 45/0005; B64D 2045/001; H01H 35/006
USPC ............................................. 73/855–860, 763
See application file for complete search history.

(56) References Cited

U.S. PATENT DOCUMENTS

| | | | |
|---|---|---|---|
| 1,371,310 A * | 3/1921 | Joy | H01H 85/044 24/369 |
| 3,522,571 A * | 8/1970 | Axford | H01H 85/042 337/170 |
| 4,189,118 A | 2/1980 | Peter-Contesse | |
| 4,273,006 A | 6/1981 | Woodbury | |
| 4,850,552 A | 7/1989 | Darden et al. | |
| 6,007,267 A | 12/1999 | VanHorn | |
| 6,483,436 B1 | 11/2002 | Emaci et al. | |
| 7,626,143 B2 | 12/2009 | Miller | |
| 7,921,729 B2 | 4/2011 | Conner et al. | |

(Continued)

FOREIGN PATENT DOCUMENTS

| | | |
|---|---|---|
| EP | 0067207 B1 | 11/1986 |
| WO | WO2011/134864 A1 | 11/2011 |

OTHER PUBLICATIONS

Extended European Search Report for EP Application No. 16182817.3, dated Mar. 22, 2017, 5 pages.

*Primary Examiner* — Max Noori
(74) *Attorney, Agent, or Firm* — Kinney & Lange, P.A.

(57) ABSTRACT

An electromechanical differential motion sensor is disposed to detect transverse motion of a first piece relative to a second piece. The sensor includes a base anchored to the first piece, a lever arm that engages the second piece, a hinge, a retention mechanism, and a fuse wire. The hinge connects the lever arm to the base, such that the lever arm rotates relative to the base when the second piece displaces laterally with respect to the first piece. The retention mechanism retains the electromechanical differential motion sensor in a closed position wherein a first jaw of the base is aligned with a second jaw of the lever arm. The fuse wire carries an electrical signal current, and extends through the jaws such that transverse motion of the second piece relative to the first piece deflects the sensor from the closed position to an open position, thereby severing the first fuse wire.

20 Claims, 6 Drawing Sheets

(56) References Cited

U.S. PATENT DOCUMENTS

| | | | |
|---|---|---|---|
| 8,516,898 B2 | 8/2013 | Mayer et al. | |
| 8,607,640 B2 | 12/2013 | Eriksen | |
| 8,820,174 B2 * | 9/2014 | Carbone | G01L 1/04 73/783 |
| 2009/0223791 A1 * | 9/2009 | Conner | B64D 45/0005 200/61.62 |
| 2012/0012638 A1 * | 1/2012 | Huang | A61B 17/07207 227/176.1 |
| 2012/0104178 A1 | 5/2012 | Carbone | |
| 2014/0137659 A1 | 5/2014 | Carbone et al. | |
| 2015/0276366 A1 * | 10/2015 | Emtman | G01B 3/205 33/701 |

* cited by examiner

DIFFERENTIAL MOTION SENSOR

BACKGROUND

The present invention relates generally to sensor systems, and more particularly to differential motion sensors such as shear or tensile-responsive electromechanical fuses.

Differential motion sensors detect transverse motion of one piece or section relative to another, adjacent piece or section. Differential motion sensors are used in a variety of aerospace applications, including in failure detection for aircraft wing vanes. Differential motion sensors are typically mounted across at least two separately moveable components to sense transverse motion therebetween.

Some differential motion sensors include electromechanical fuses that bridge an electrical gap. These fuses break in tension when sufficient shear occurs, opening an electrical circuit. Differential motion sensors of this type are ordinarily mounted on one component, and have lever arms that extend to engage a pin or stud on a second, adjacent component. Shear deflection (i.e. transverse motion) of one component relative to the other applies tensile load to the lever arm, resulting in increased tensile load on the fuse. Under high tensile load, the fuse fractures mechanically, creating an electrical gap that can be detected by a connected controller. Fuses are relatively expensive and complex to manufacture, and must be replaced in order to reset this type of sensor. In addition, these kinds of electromechanical fuses break at a fixed tensile load threshold that cannot be adjusted without redesign.

SUMMARY

In one aspect, an electromechanical differential motion sensor is disposed to detect transverse motion of a first piece relative to a second piece. The electromechanical shear fuse comprises a base, a lever arm, a hinge, a retention mechanism, and a fuse wire. The base is disposed to be anchored to the first piece, and has a first jaw. The lever arm extends from the base to engage the second piece, and has a second jaw. The hinge is disposed along a hinge axis and pivotally connects the lever arm to the base, such that the lever arm rotates relative to the base when the second piece displaces laterally with respect to the first piece. The retention mechanism is disposed between the base and the lever arm, and is configured to supply a retention load that retains the electromechanical differential motion sensor in a closed position wherein the first jaw is aligned with the second jaw. The fuse wire is configured to carry an electrical signal current, and extends through the first jaw and the second jaw, such that shear movement of the second piece relative to the first piece sufficient to overcome the retention load deflects the second jaw relative to the first jaw from the closed position to an open position wherein the first jaw is not aligned with the second jaw, thereby severing the fuse wire.

In another aspect, a method is provided for sensing transverse motion between a first piece and a second piece. A base with a first jaw is anchored to the first piece, and a lever arm with a second jaw is rotatably secured to the base, such that the lever arm engages the second piece. A fuse wire is threaded through a scissor passage comprised of the first and second jaws. A signal current is transmitted through the fuse wire, and the lever arm is biased with a biasing load towards a closed position wherein the first and second jaws are aligned. The fuse wire is severed when shear of the first piece relative to the second piece is sufficient to overcome the biasing load, thereby rotating the lever arm relative to the base, such that the lever arm moves from the closed position to an open position wherein the first and second jaws are not aligned. The resulting interruption of the signal current is sensed, so as to flag a shear event.

BRIEF DESCRIPTION OF THE DRAWINGS

FIG. 2 is a first cross-sectional view of the electromechanical differential motion sensor of FIGS. 1a and 1b taken along line 2-2 of FIG. 1a.

FIG. 3 is a second cross-sectional view of the electromechanical differential motion sensor of FIGS. 1a and 1b taken along line 3-3 of FIG. 1a.

FIGS. 5a and 5b are taken along section lines 5a-5a and 5b-5b in FIGS. 1a and 1b, respectively.

Figure 1A:
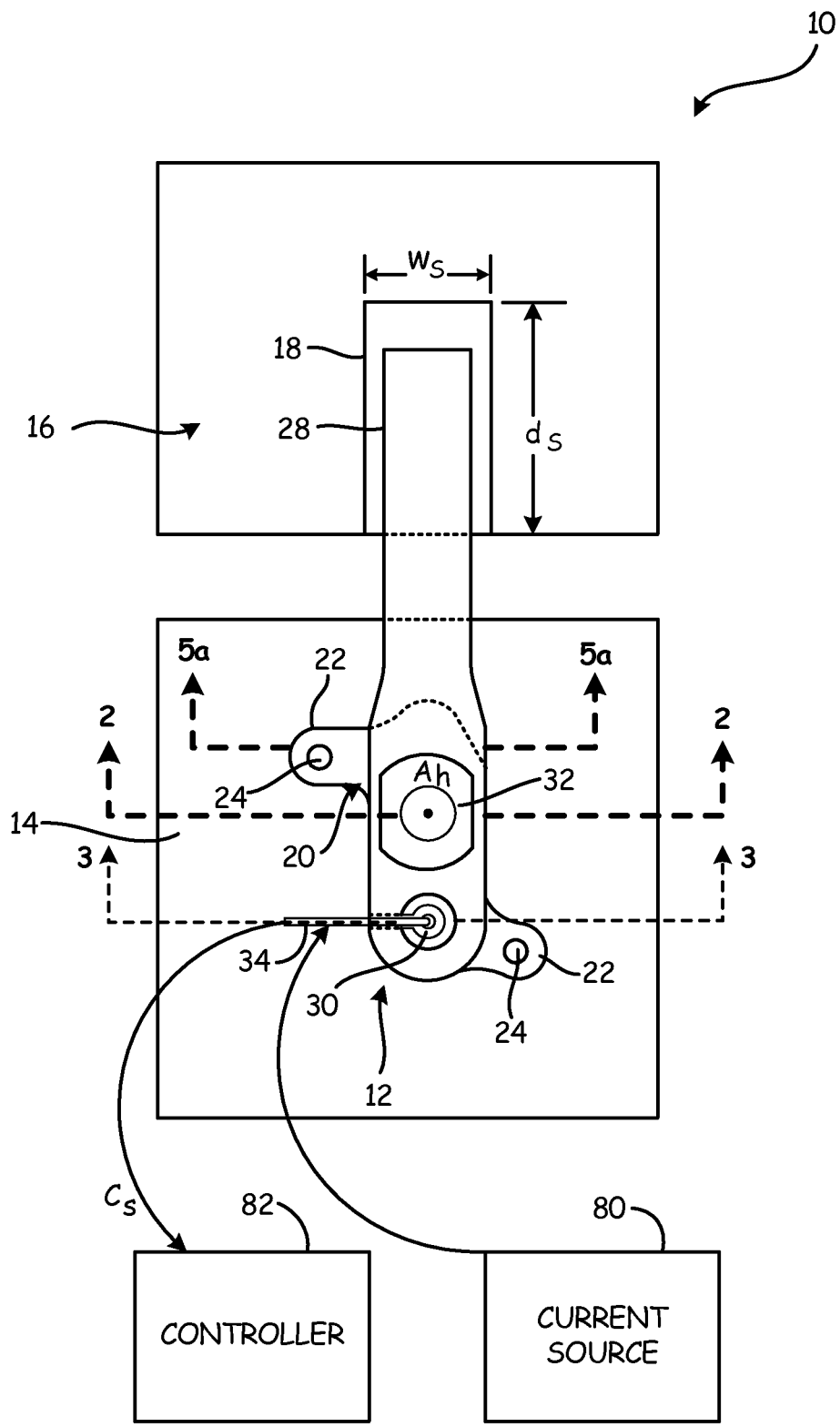
FIGS. 1a and 1b are plan views of an electromechanical differential motion sensor in closed and open states, respectively.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure relates generally to a differential motion sensor comprising a lever arm and a base that cooperate to form a scissor passage. Shear relative to an adjacent structure deflects the lever arm, severing a signal current-carrying wire at the scissor passage. The lever arm and base are biased against deflection by a retention mechanism. This retention mechanism determines a degree of deflection required to trigger the differential motion sensor.

Figure 1B:
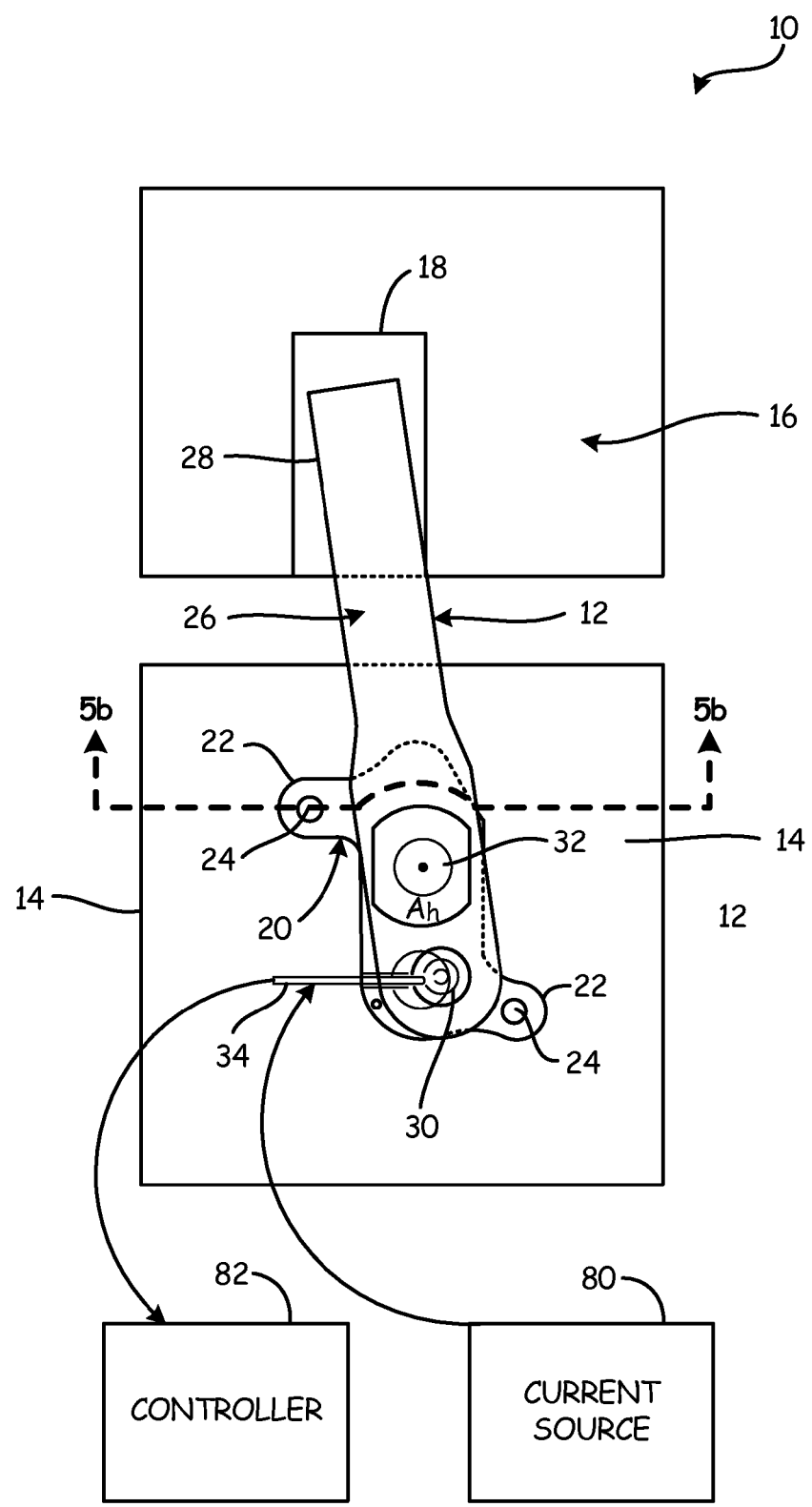

FIGS. 1a and 1b depict sensor system 10 in closed and open states, respectively. Sensor system 10 comprises differential motion sensor 12 bridging first part 14 and second part 16. Differential motion sensor 12 is anchored to first part 14, and retained within retention slot 18 of second part 16. Differential motion sensor 12 comprises base 20 (with retention tabs 22 having fastener holes 24), lever arm 26 (with torque arm 28), scissor passage 30, hinge pin 32, fuse wires 34, current source 35a, and controller 35b.

Base 20 is a rigid structural element anchored to first piece 14. In the illustrated embodiment, base 20 can be affixed to first piece 14 by fasteners such as pins or screws (not shown) through fastener holes 24, and into first piece 14. Retention tabs 22 provide anchoring locations for fastener holes 24. In alternative embodiments, base 20 can be anchored to first piece 14 in any other way that retains the orientation of base 20 relative to first piece 14 and second piece 16, such as by situating base 20 in a track or groove within first piece 14.

In some embodiments, base 20 can be free to move towards and/or away from second piece 16, while remaining anchored to first piece 14.

Lever arm 26 is a rigid structural element rotatably secured to base 20. In the depicted embodiment, lever arm 26 is secured to base 20 via hinge pin 32. Hinge pin 32 is illustrated in greater detail with respect to FIG. 2. Although differential motion sensor 12 is depicted with hinge pin 32, other types of hinges can alternatively be used to rotatably connect base 20 to lever arm 26. Hinge pin 32 is centered on hinge axis $A_h$, which forms the axis of rotation about which lever arm 26 rotates with respect to base 20. Lever arm 26 includes torque arm 28, a laterally extending rod or arm that engages second piece 16 at retention a lot 18. In the depicted embodiment, retention slot 18 is a substantially rectangular slot with slot depth $d_s$ and slot width $w_s$. Slot depth $d_s$ and slot width $w_s$ are selected to allow torque arm 28 to shift within retention slot 18. In general, retention slot 18 can be any shape that permits some lateral movement of first piece 14 relative to second piece 16, while deflecting torque arm 28 when first piece 14 moves transverse to second piece 16 or vice-versa.

Scissor passage 30 is a cutting aperture extending through both base 20 and lever arm 26. Scissor passage 30 is depicted and described in greater detail with respect to FIG. 3, below. Fuse wires 34 extend from current source 35a through scissor passage 30, to controller 35b. Scissor passage 30 severs fuse wires 34 if and when transverse movement of first piece 14 relative to second piece 16 applies torque to torque arm 28, thereby rotating lever arm 26 about hinge axis $A_h$ with respect to base 20. In one embodiment, at least two distinct fuse wires 34 representing separate (and therefore redundant) signal channels extend through scissor passage 30 from current source 35a to controller 35b. Fuse wires 34 are electrically isolated from base 20 and lever arm 26, e.g. by insulative potting and/or sheaths.

Current source 35a generates signal current $c_s$, and controller 35b receives signal current $c_s$. Signal current $c_s$ can, for example, be a continuous DC current, or an intermittently or regularly pulsed AC or DC current. Controller 35b monitors reception of signal current $c_s$, and flags a shear event or shear fault if signal current $c_s$ is interrupted. Controller 35b can, for example, flag a shear event if a threshold number (one or more) regularly AC or DC current pulses are missed, or if continuous current from current source 35a cuts out. In some embodiments current source 35a and controller 35b can be parts of a single unitary control system that both transmits and receives signal current $c_s$. In other embodiments, signal current $c_s$ can be generated elsewhere, e.g. from a dedicated current source. Fuse wires 34 carry signal current $c_s$ through scissor passage 30. If relative motion of second piece 16 with respect to first piece 14 causes lever arm 26 to deflect with respect to base 20, scissor passage 30 severs fuse wires 34, thereby interrupting signal current $c_s$.

FIG. 1a illustrates differential motion sensor 12 in a closed state, while FIG. 1b illustrates differential motion sensor 12 in an open state. In the closed state, fuse wire 34 is threaded through scissor passage 30, and controller 35b can receive transmissions of signal current $c_s$ from current source 35a. In its open state, sensor 12 severs both fuse wires 34 at scissor passage 30, thereby interrupting transmissions of signal current $c_s$ from current source 35a to controller 35b. Differential motion sensor 12 transitions from closed state of FIG. 1a to the open state of FIG. 1b when first piece 14 moves transversely sufficiently with respect to second piece 16. Only fuse wire 34 is destroyed in this process of transitioning from closed to open states of differential motion sensor 12. Consequently, differential motion sensor 12 can be reset by merely replacing fuse wires 34 (and optional potting) and returning lever arm 26 its closed state position, as described in further detail below.

Figure 2:
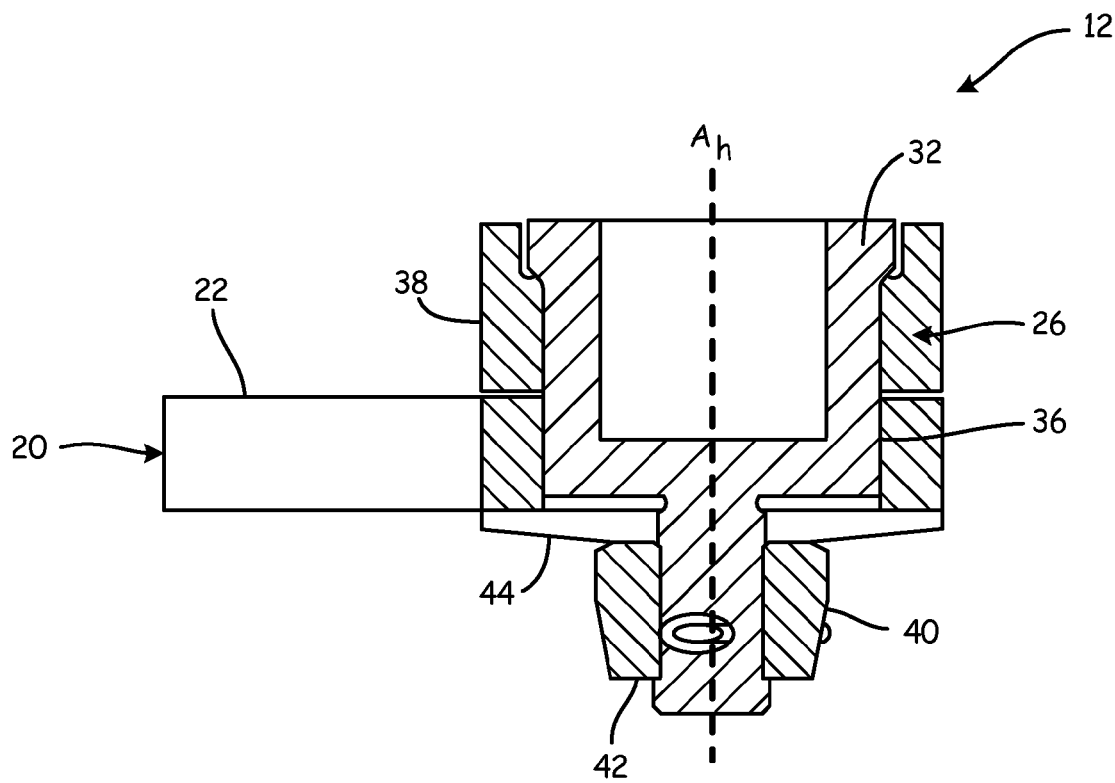

FIG. 2 is a cross-sectional view of differential motion sensor 12 through section line 2-2 of FIG. 1a. FIG. 2 depicts base 20 (with retention tab 22 and base hinge opening 36), lever arm 26 (with lever hinge opening 38), hinge pin 32, retaining nut 40, retaining pin 42, and spring plate 44. Base 20, retention tab 22, lever arm 26, and hinge pin 32 operate as described above with respect to FIGS. 1a and 1b.

Hinge pin 32 provides one embodiment of a hinge rotatably connecting base 20 to lever arm 26. Hinge pin 32 passes through base hinge opening 36 and lever hinge opening 38 of base 20 and lever arm 26, respectively, and is secured by retaining nut 40, retaining pin 42, and spring plate 44. Retaining pin 42 is a bolt, pin, bobbin, or other fastener securing retaining nut 40 to hinge pin 32 at a fixed location. Spring plate 44 is a biasing element abutting retaining nut 40 and base 20, and can, for example, be a wave spring or Belleville washer. Spring plate 44 provides a spring force $F_k$ that forces retaining nut 40 away from base 20, thereby clamping lever arm 26 to base 20 via hinge pin 32. The spring constant of spring plate 44 and the position and height of retaining nut 40 on hinge pin 32 determine the magnitude of spring force $F_k$. Spring force $F_k$ ensures that lever arm 26 closely conforms to base 20, enabling scissor passage 30 to effectively cut through fuse wires 34 as described above with respect to FIGS. 1a and 1b, and in further detail below with respect to FIG. 3. In some embodiments, spring force $F_k$ also determines the magnitude of a retention load preventing differential motion sensor 12 from transitioning from the closed state into the open state, as described below with respect to FIGS. 5a and 5b.

Figure 3:
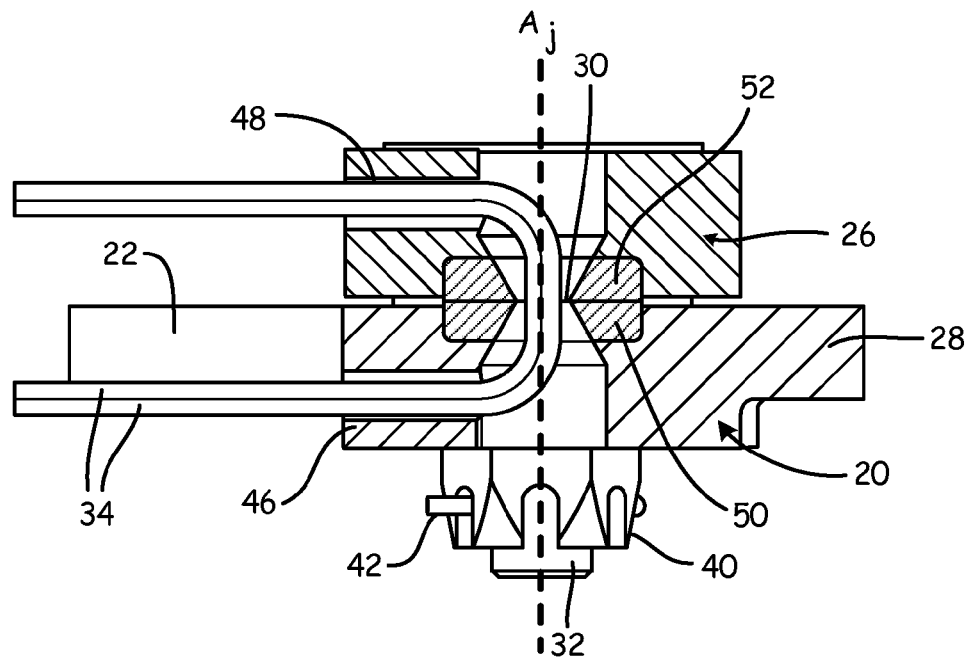

FIG. 3 is a cross-sectional view of differential motion sensor 12 through section line 3-3 of FIG. 1a. FIG. 3 depicts base 20 (with retention tabs 22, base wire slot 46, first jaw 50, and first cutting surface 54), lever arm 26 (with lever wire slot 48, second jaw 52, and second cutting surface 56), scissor passage 30, hinge pin 32, fuse wires 34, retaining nut 40, and retaining pin 42. Base 20, retention tabs 22, lever arm 26, hinge pin 32, fuse wires 34, retaining nut 40, and retaining pin 42 all operate as described with respect to FIGS. 1a, 1b, and 2.

Fuse wires 34 are threaded through base wire slot 46, scissor passage 30, and lever wire slot 48. Base wire slot 46 and lever wire slot 48 position fuse wires 34 within differential motion sensor 12. In the depicted embodiment, two distinct fuse wires 34 are threaded through scissor passage 30. More generally, one or more fuse wires 34 each constitute a separate sensor channel. Additional fuse wires 34 beyond the first provide redundancy that allows sensor system 12 to continue functioning despite wire corrosion, disconnection, and/or other conditions that render some but not all fuse wires 34 or their sensor channels to be open. Controller 35b (see FIGS. 1a and 1b) can, for example, flag a shear condition or shear fault if and only if no signal current $c_s$ is received through any fuse wire 34. If and when transverse motion of first piece 14 relative to second piece 16 causes scissor passage 30 to sever fuse wires 34, all fuse wires 34 will be cut. Each fuse wire 34 can, for example, include a conductive wire core surrounded by protective, insulative sheath.

As noted above, scissor passage 30 is a cutting aperture formed through base 20 and lever arm 26. First and second jaws 50 and 52 of base 20 and lever arm 26, respectively, define cutting surfaces 54 and 56, respectively, of scissor passage 30. First and second jaws 50 and 52 are biased together by spring force $F_k$, and cutting surfaces 54 and 56 are angled oppositely with respect to hinge axis $A_h$. Cutting surfaces 54 and 56 converge towards jaw axis $A_j$, forming a sharp edge therebetween that gives scissor joint 30 an hourglass shape (in the closed position). Sufficient shear of first piece 14 relative to second piece 16 causes first and second jaws 50 and 52, respectively, to entirely close scissor passage 30, severing fuse wires 34. First and second jaws 50 and 52 can be made of a non-conductive material to prevent current transmission through jaws 50 and 52 after fuse wires 34 have been severed. In some embodiments, first and second jaws 50 and 52 can, for example, be formed of a durable ceramic. In the depicted embodiment, jaws 50 and 52 are non-conductive inserts attached to or embedded within base 20 and lever arm 26, respectively. Base 20 and lever arm 26 need not be non-conductive, and can be formed of any material having appropriate structural characteristics, including metals and durable plastics.

Although fuse wires 34 can be formed of a durable material, mechanical resistance to this severing motion of first jaw 50 relative to second jaw 52 from wire durability can be negligible compared to a retention load provided by retention mechanisms described below with respect to FIGS. 4a, 4b, 5a, and 5b. This retention load, as described hereinafter, prevents scissor passage 30 from severing fuse wires 34 when subjected to handling or normal acceleration loads.

Figure 4A:
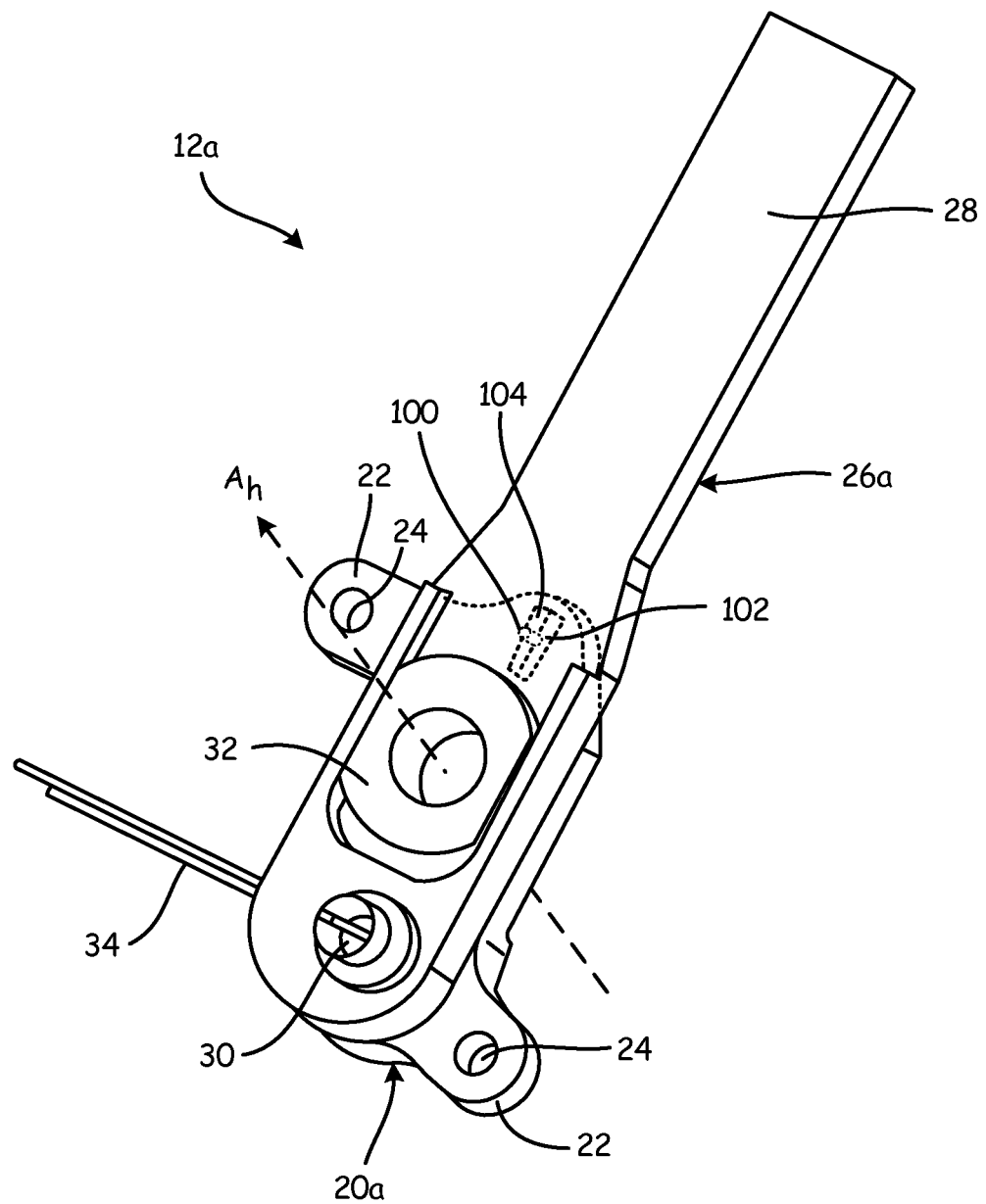
FIGS. 4a and 4b are perspective views of the electromechanical differential motion sensor of FIGS. 1a and 1b, illustrating a first embodiment of a retention mechanism including a retention pin.
Figure 4B:
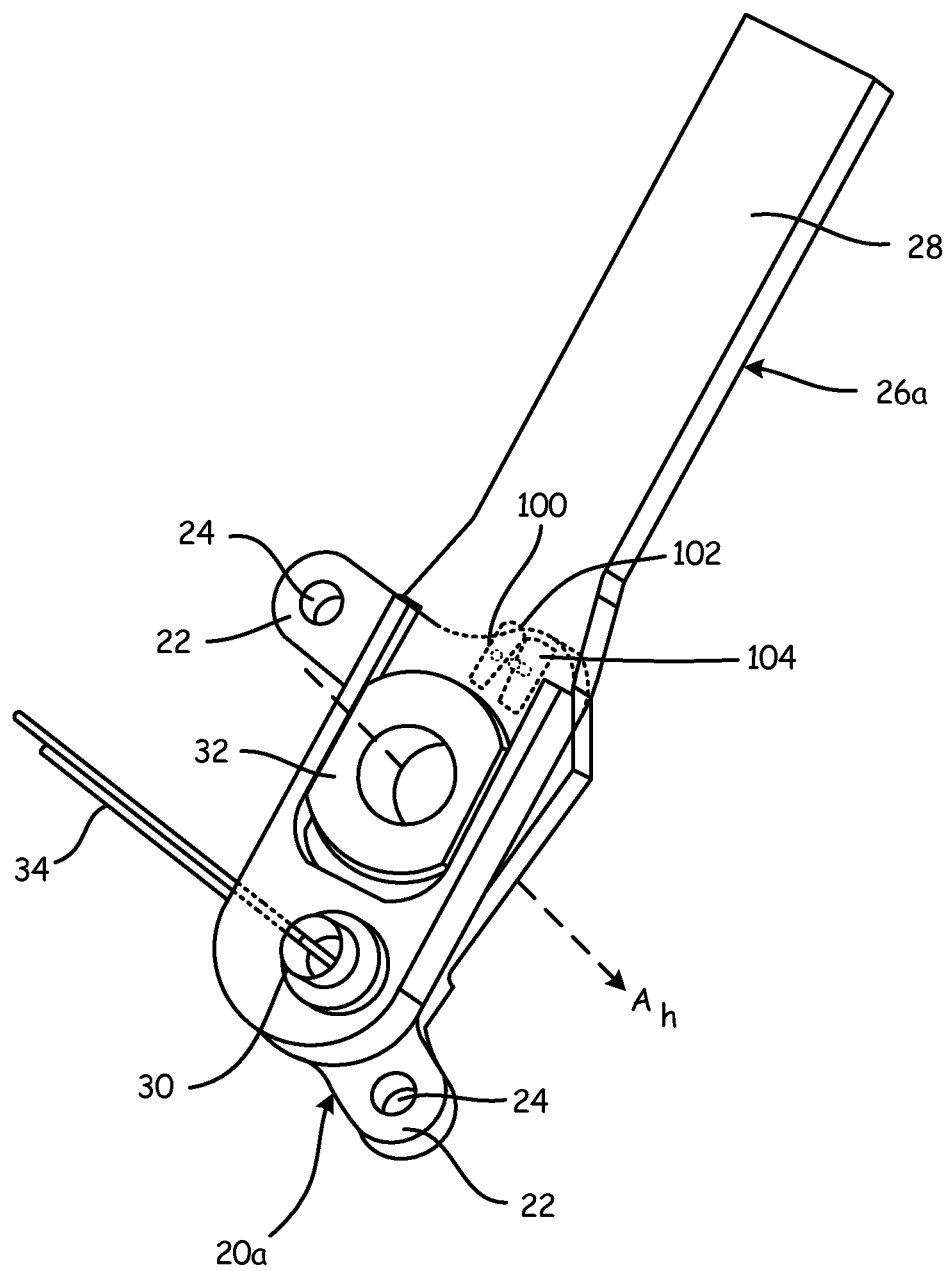

FIGS. 4a and 4b depict differential motion sensor 12a in closed and open states, respectively. FIGS. 4a and 4b illustrate base 20a (with retention tabs 22, fastener holes 24, and base lock ridge 104), lever arm 26a (with torque arm 28 and lever lock ridge 102), scissor passage 30, hinge pin 32, fuse wires 34, and retention pin 100. Differential motion sensor 12a, base 20a and lever arm 26a operate as described above with respect to differential motion sensor 12a, base 20, and lever arm 26, above. Differential motion sensor 12a additionally includes a retention mechanism including retention pin 100, lever lock ridge 102, and base lock ridge 104, which cooperate to provide a retention load that retains differential motion sensor 12a in a closed state as described above.

Retention pin 100 is a destructible pin that connects base 20 to lever arm 26. In particular, retention pin 100 can be a post or strip embedded in or otherwise affixed to both base 20 and lever arm 26. Although retention pin 100 is described as a pin, other destructible components connecting base 20 to lever arm 26 and preventing relative rotation therebetween can be substituted. Retention pin 100 serves as a mechanical fuse, and differential motion sensor 12a cannot move from the closed to the open position without breaking retention pin 100. The mechanical load required to tear, break, or otherwise destroy retention pin 100 determines the retention load biasing differential motion sensor 12a into a closed state, as described above with respect to FIG. 3.

Differential motion sensor 12a includes lever lock ridge 102 and base lock ridge 104. In the depicted embodiment, lock ridges 102 and 104 are facing ridges situated at retention locations on lever arm 26 and base 20, respectively, where retention pin 100 is anchored. More generally, lock ridge 102 and 104 are aligned in a plane orthogonal to hinge axis $A_h$ so long as differential motion sensor 12a is in the closed state, but become misaligned if and when differential motion sensor 12a shifts into an open state. In some embodiments, lock ridges 102 and 104 can be positioned in other coincident locations on base 20 and lever arm 26, or can be omitted altogether. As described above with respect to FIG. 2, spring force $F_k$ biases base 20 and lever arm 26 together. Consequently, lock ridges 102 and 104 interfere to prevent differential motion sensor 12a from returning to a closed position after shifting to an open position Shear events break retention pin 100, allowing scissor passage 30 to sever fuse wires 34. Differential motion sensor 12a can be reset by realigning base 20 and lever arm 26 (i.e. into closed positions), and replacing fuse wires 34 and retention pin 100.

Figure 5A:
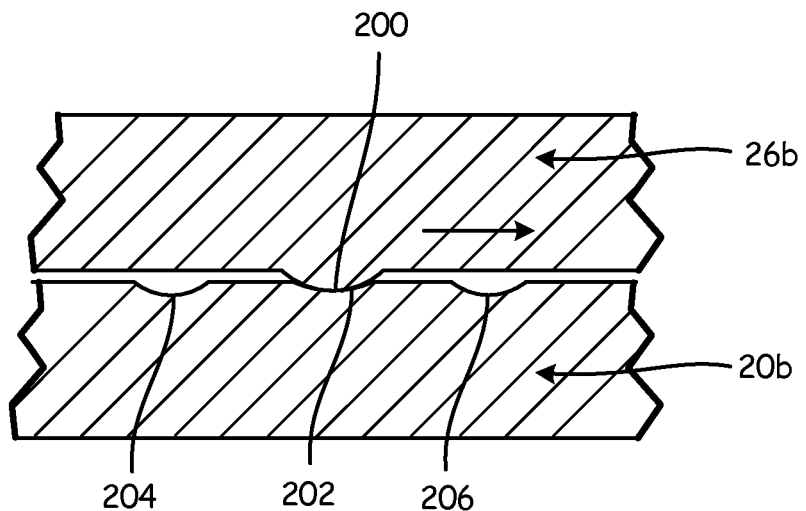
FIGS. 5a and 5b are simplified cross-sectional views of a portion of the electromechanical differential motion sensor of FIGS. 1a and 1b, illustrating a second embodiment of the retention mechanism including a plurality of detents.
Figure 5B:
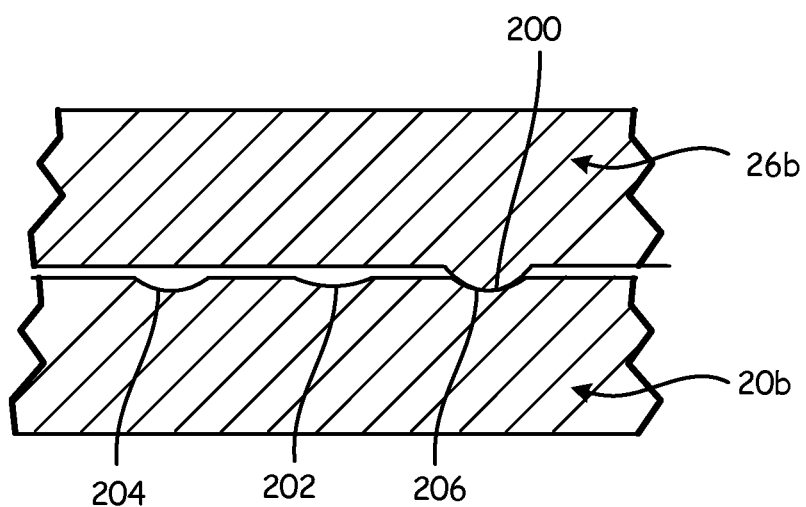

FIGS. 5a and 5b depict differential motion sensor 12b (with base 20b and lever arm 26b) in closed and open states, respectively. Differential motion sensor 12b is one embodiment of differential motion sensor 12 having a retention mechanism including retention ridge 200 and detents 202, 204, and 206. FIGS. 5a and 5b are cross-sectional views of differential motion sensor 12b through cross-section lines 5a-5a and 5b-5b of FIGS. 1a and 1b, respectively. In the illustrated embodiment, retention ridge 200 is a raised nub or bump extending from lever arm 26b towards base 20b, and detents 202, 204, and 206 are depressions in base 20b disposed to receive retention ridge 200. In alternative embodiments, the position of retention ridge 200 and detents 202, 204, and 206 can be reversed, such that retention ridge extends from base 20b towards lever arm 26b, and detents 202, 204, and 206 are located in lever arm 26b. Some embodiments of the present invention may include multiple retention ridges, and more than three corresponding detents. In the depicted embodiment, as illustrated in FIG. 1a, retention ridge 200 and detents 202, 204, and 206 are situated substantially opposite hinge pin 32 from scissor passage 30.

Retention ridge 200 engages detent 202 in a closed state of differential motion sensor 12b. As described above with respect to FIG. 2, spring force $F_k$ biases base 20b and lever arm 26b together. Spring force $F_k$ and the elevation/depression of retention ridge 200 and detent 202 accordingly determine the retention load that must be overcome to rotate lever arm 26b from a closed position (FIG. 5a) to an open position (FIG. 5b). Deeper detents 202 and more elevated retention ridges 200, and/or greater spring force $F_k$ will increase the magnitude of this retention load. After lever arm 26b shifts to an open position, retention ridge 200 will engage either detent 204 or detent 206, depending on the direction of the triggering shear. Once retention ridge 200 has engaged detent 204 or detent 206, a new retention load (based on elevation of retention ridge 200, spring force $F_k$, and depth of detent 204 or 206) prevents differential motion sensor 12b from returning to its closed state. This return retention load can be separately configured to be greater or lesser than the primary retention load that holds differential motion sensor 12b in its closed state by varying the relative depths of detents 202, 204, and 206. The overall retention load in all cases can be adjusted by varying spring force $F_k$.

Unlike the retention mechanism illustrated in FIGS. 4a and 4b, the retention mechanism of FIGS. 5a and 5b is nondestructive. Consequently, differential motion sensor 12b can be reset by simply realigning base 20b and lever arm 26b in the closed state, and replacing fuse wire 34.

Differential motion sensor 12 (including embodiments 12a and 12b) responds to between first and second pieces 14 and 16 by severing fuse wire 34, thereby interrupting signal current $c_s$ en route to controller 35b. Controller 35b responds by flagging a shear fault. The shear force magnitude required to sever fuse wire 34 can be configured by varying retention mechanisms as described with respect to FIGS. 4a, 4b, 5a, and 5b, independently of the mechanical shear strength of fuse wire 34. Furthermore, differential motion sensor 12 can be reset by realigning base 20 with lever arm 26 and replacing fuse wire 34.

Discussion of Possible Embodiments

The following are non-exclusive descriptions of possible embodiments of the present invention.

An electromechanical differential motion sensor disposed to detect transverse motion of a first piece relative to a second piece, the electromechanical shear fuse system comprising: a base disposed to be anchored to the first piece, and having a first jaw; a lever arm extending from the base to engage the second piece, and having a second jaw; a hinge disposed along a hinge axis and pivotally connecting the lever arm to the base, such that the lever arm rotates relative to the base when the second piece displaces laterally with respect to the first piece; a retention mechanism disposed between the base and the lever arm and configured to supply a retention load that retains the electromechanical differential motion sensor in a closed position wherein the first jaw is aligned with the second jaw; a first fuse wire configured to carry a first electrical signal current, and extending through the first jaw and the second jaw, such that transverse movement of the second piece relative to the first piece sufficient to overcome the retention load deflects the second jaw relative to the first jaw from the closed position to an open position wherein the first jaw is not aligned with the second jaw, thereby severing the first fuse wire.

The electromechanical differential motion sensor of the preceding paragraph can optionally include, additionally and/or alternatively, any one or more of the following features, configurations and/or additional components:

A further embodiment of the foregoing electromechanical differential motion sensor, further comprising: a current source configured to generate the first electrical signal current; and a controller configured to receive the first electrical signal current through the first fuse wire, and further configured to flag a shear event if the first electrical signal current is not received.

A further embodiment of the foregoing electromechanical differential motion sensor, further comprising a second fuse wire disposed parallel to the first fuse wire, through the first jaw and the second jaw, to carry a second electrical signal current from the current source to the controller.

A further embodiment of the foregoing electromechanical differential motion sensor, wherein the controller flags a shear event only if neither the first electrical signal current nor the second electrical signal current are received by the controller.

A further embodiment of the foregoing electromechanical differential motion sensor, wherein the retention mechanism comprises: a destructible retention pin connecting a first retention location of the lever arm to a second retention location on the base, such that the electromechanical differential motion sensor cannot open from the closed position into the open position without breaking the destructible retention pin.

A further embodiment of the foregoing electromechanical differential motion sensor, wherein the first and second retention locations are aligned in a plane normal to the hinge axis, when the electromechanical fuse sensor is in the closed position, and further comprising: a first ridge at the first retention location extending from the base towards the lever arm; and a second ridge at the second retention location extending from the lever arm towards the base, such that the first ridge abuts the second ridge when the electromechanical differential motion sensor is in the closed position.

A further embodiment of the foregoing electromechanical differential motion sensor, wherein the first ridge engages the second ridge when the differential motion sensor is in the open position, thereby preventing the electromechanical differential motion sensor from returning to the closed position after entering the open position.

A further embodiment of the foregoing electromechanical differential motion sensor, wherein the retention mechanism comprises: a plurality of detents in one of the lever arm and the base, situated opposite the hinge from the fuse wire; and a ridge extending from the other of the lever arm and the base, situated opposite the hinge from the fuse wire; wherein the ridge engages a first of the plurality of detents while the electromechanical differential motion sensor is in the closed position, but engages a second of the plurality of detents while the electromechanical differential motion sensor is in the open position.

A further embodiment of the foregoing electromechanical differential motion sensor, further comprising a spring biased to apply a spring force along the hinge axis that pushes the base and lever arm together, such that the spring force determines the retention load.

A further embodiment of the foregoing electromechanical differential motion sensor, wherein A further embodiment of the foregoing electromechanical differential motion sensor, wherein A further embodiment of the foregoing electromechanical differential motion sensor, wherein the hinge is a hinge pin passing through the base and the lever arm, and wherein the spring is an annular spring plate positioned on the hinge pin and biased by a retaining nut disposed on the hinge pin.

A further embodiment of the foregoing electromechanical differential motion sensor, wherein the lever arm engages a slot within the second piece.

A further embodiment of the foregoing electromechanical differential motion sensor, wherein the base has a retaining tab with a fastener opening disposed to receive a fastener that anchors the base to the first piece.

A further embodiment of the foregoing electromechanical differential motion sensor, wherein A further embodiment of the foregoing electromechanical differential motion sensor, wherein the first fuse wire is an insulated wire comprising a conductive wire core surrounded by an insulating sheath.

A further embodiment of the foregoing electromechanical differential motion sensor, wherein the first jaw and the second jaw are formed of a non-conductive material.

A further embodiment of the foregoing electromechanical differential motion sensor, wherein the non-conductive material is a ceramic.

A further embodiment of the foregoing electromechanical differential motion sensor, wherein the first and second jaws are biased together and have first and second cutting surfaces, respectively, and wherein the first and second cutting surfaces are angled oppositely with respect to the hinge axis, and converge towards the hinge axis.

A method for sensing transverse motion between a first piece and a second piece, the method comprising: running a fuse wire through a scissor passage comprised of a first jaw in a base anchored to the first piece, and a second jaw in a lever arm pivotally secured to the base such that the lever arm engages the second piece; transmitting a signal current through the fuse wire; biasing the lever arm towards a closed position wherein the first and second jaws are aligned, with a biasing load; severing the fuse wire when transverse motion of the first piece relative to the second piece is sufficient to overcome the biasing load, thereby rotating the lever arm relative to the base, such that the lever arm moves from the closed position to an open position wherein the first and second jaws are not aligned; and sensing resulting interruption of the signal current when the fuse wire is severed.

The method of the preceding paragraph can optionally include, additionally and/or alternatively, any one or more of the following features, configurations and/or additional components:

A further embodiment of the foregoing method, wherein biasing the lever arm comprises connecting the lever arm to the base via a destructible retention pin, such that the lever arm cannot move from the closed position to the open position without breaking the destructible retention pin.

A further embodiment of the foregoing method, wherein biasing the lever arm comprises retaining a ridge on one of the lever arm and the base against a plurality of detents on the other of the lever arm and the base, such that the lever arm cannot move from the closed position without the ridge shifting from one of the plurality of detents to another of the plurality of detents.

A further embodiment of the foregoing method, further comprising: resetting the lever arm into the closed position; replacing the fuse wire; and resuming transmission of the signal current through the replaced fuse wire.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electromechanical differential motion sensor disposed to detect transverse motion of a first piece relative to a second piece, the electromechanical shear fuse system comprising:
    a base disposed to be anchored to the first piece, and having a first jaw;
    a lever arm extending from the base to engage the second piece, and having a second jaw;
    a hinge disposed along a hinge axis and pivotally connecting the lever arm to the base, such that the lever arm rotates relative to the base when the second piece displaces laterally with respect to the first piece;
    a retention mechanism disposed between the base and the lever arm and configured to supply a retention load that retains the electromechanical differential motion sensor in a closed position wherein the first jaw is aligned with the second jaw;
    a first fuse wire configured to carry a first electrical signal current, and extending through the first jaw and the second jaw, such that transverse movement of the second piece relative to the first piece sufficient to overcome the retention load deflects the second jaw relative to the first jaw from the closed position to an open position wherein the first jaw is not aligned with the second jaw, thereby severing the first fuse wire.

2. The electromechanical differential motion sensor of claim 1, further comprising:
    a current source configured to generate the first electrical signal current; and
    a controller configured to receive the first electrical signal current through the first fuse wire, and further configured to flag a shear event if the first electrical signal current is not received.

3. The electromechanical differential motion sensor of claim 1, further comprising a second fuse wire disposed parallel to the first fuse wire, through the first jaw and the second jaw, to carry a second electrical signal current from the current source to the controller.

4. The electromechanical differential motion sensor of claim 3, wherein the controller flags a shear event only if neither the first electrical signal current nor the second electrical signal current are received by the controller.

5. The electromechanical differential motion sensor of claim 1, wherein the retention mechanism comprises:
    a destructible retention pin connecting a first retention location of the lever arm to a second retention location on the base, such that the electromechanical differential motion sensor cannot open from the closed position into the open position without breaking the destructible retention pin.

6. The electromechanical differential motion sensor of claim 5, wherein the first and second retention locations are aligned in a plane normal to the hinge axis, when the electromechanical fuse sensor is in the closed position, and further comprising:
    a first ridge at the first retention location extending from the base towards the lever arm; and
    a second ridge at the second retention location extending from the lever arm towards the base, such that the first ridge abuts the second ridge when the electromechanical differential motion sensor is in the closed position.

7. The electromechanical differential motion sensor of claim 6, wherein the first ridge engages the second ridge when the differential motion sensor is in the open position, thereby preventing the electromechanical differential motion sensor from returning to the closed position after entering the open position.

8. The electromechanical differential motion sensor of claim 1, wherein the retention mechanism comprises:
    a plurality of detents in one of the lever arm and the base, situated opposite the hinge from the fuse wire; and
    a ridge extending from the other of the lever arm and the base, situated opposite the hinge from the fuse wire;
    wherein the ridge engages a first of the plurality of detents while the electromechanical differential motion sensor is in the closed position, but engages a second of the plurality of detents while the electromechanical differential motion sensor is in the open position.

9. The electromechanical differential motion sensor of claim 8, further comprising a spring biased to apply a spring force along the hinge axis that pushes the base and lever arm together, such that the spring force determines the retention load.

10. The electromechanical differential motion sensor of claim 9, wherein the hinge is a hinge pin passing through the base and the lever arm, and wherein the spring is an annular spring plate positioned on the hinge pin and biased by a retaining nut disposed on the hinge pin.

11. The electromechanical differential motion sensor of claim 1, wherein the lever arm engages a slot within the second piece.

12. The electromechanical differential motion sensor of claim 1, wherein the base has a retaining tab with a fastener opening disposed to receive a fastener that anchors the base to the first piece.

13. The electromechanical differential motion sensor of claim 1, wherein the first fuse wire is an insulated wire comprising a conductive wire core surrounded by an insulating sheath.

14. The electromechanical differential motion sensor of claim 1, wherein the first jaw and the second jaw are formed of a non-conductive material.

15. The electromechanical differential motion sensor of claim 14, wherein the non-conductive material is a ceramic.

16. The electromechanical differential motion sensor of claim 1, wherein the first and second jaws are biased together and have first and second cutting surfaces, respectively, and wherein the first and second cutting surfaces are angled oppositely with respect to the hinge axis, and converge towards the hinge axis.

17. A method for sensing transverse motion between a first piece and a second piece, the method comprising:

running a fuse wire through a scissor passage comprised of a first jaw in a base anchored to the first piece, and a second jaw in a lever arm pivotably secured to the base such that the lever arm engages the second piece;

transmitting a signal current through the fuse wire;

biasing the lever arm towards a closed position wherein the first and second jaws are aligned, with a biasing load;

severing the fuse wire when transverse motion of the first piece relative to the second piece is sufficient to overcome the biasing load, thereby rotating the lever arm relative to the base, such that the lever arm moves from the closed position to an open position wherein the first and second jaws are not aligned; and sensing resulting interruption of the signal current when the fuse wire is severed.

18. The method of claim 17, wherein biasing the lever arm comprises connecting the lever arm to the base via a destructible retention pin, such that the lever arm cannot move from the closed position to the open position without breaking the destructible retention pin.

19. The method of claim 17, wherein biasing the lever arm comprises retaining a ridge on one of the lever arm and the base against a plurality of detents on the other of the lever arm and the base, such that the lever arm cannot move from the closed position without the ridge shifting from one of the plurality of detents to another of the plurality of detents.

20. The method of claim 17, further comprising:
resetting the lever arm into the closed position;
replacing the fuse wire; and
resuming transmission of the signal current through the replaced fuse wire.

* * * * *